United States Patent [19]

Freudelsperger

[11] Patent Number: 5,641,161
[45] Date of Patent: Jun. 24, 1997

[54] ARRANGEMENT FOR DELIVERING ITEMS FROM MAGAZINES

[75] Inventor: Di Karl Freudelsperger, Hausmannstätten, Austria

[73] Assignee: Knapp Holding GmbH, Hart bei Graz, Austria

[21] Appl. No.: 523,893

[22] Filed: Sep. 6, 1995

[30] Foreign Application Priority Data

Sep. 9, 1994 [AU] Australia .................. 1731/94

[51] Int. Cl.$^6$ ............................ B65H 39/10
[52] U.S. Cl. .................. 271/301; 271/103; 414/797.7; 414/798
[58] Field of Search .................. 414/276, 797.7, 414/797.9, 798, 798.1; 221/103, 251, 301

[56] References Cited

U.S. PATENT DOCUMENTS

| | | | |
|---|---|---|---|
| 2,393,961 | 2/1946 | Almgren | 414/797.7 |
| 2,435,526 | 2/1948 | Young et al. | 221/301 |
| 2,877,928 | 3/1959 | Patzer et al. | 221/103 |
| 2,956,660 | 10/1960 | Nordquist | 221/301 |
| 3,157,292 | 11/1964 | Pachell | |
| 3,999,684 | 12/1976 | Elkholm | 221/301 |
| 4,896,792 | 1/1990 | Marchand | 221/103 |
| 4,928,511 | 5/1990 | Sivret | 414/797.7 |

FOREIGN PATENT DOCUMENTS

| | | |
|---|---|---|
| 0165918 | 4/1985 | European Pat. Off. . |
| 1326124 | 8/1963 | France . |
| 2952764 | 7/1981 | Germany . |
| 3015203 | 10/1981 | Germany . |
| 9110327 | 11/1991 | Germany . |
| 646381 | 9/1962 | Italy .................. 221/301 |
| 2091674 | 8/1982 | United Kingdom . |

*Primary Examiner*—Karen B. Merritt
*Assistant Examiner*—Douglas Hess
*Attorney, Agent, or Firm*—Sughrue, Mion, Zinn, Macpeak & Seas

[57] ABSTRACT

An arrangement for delivering stacked items from magazines inclined relative to the vertical through a delivery opening at a magazine lower end side includes a rotor with radial blades located in the vicinity of the delivery opening of the magazines to deliver items from the magazines. The rotor has an axis of rotation arranged in or below the bottom of the magazine, and the blades, while rotating, move on a continuous path partially extending through the magazine. Each blade serves as a delivery member for the items and moves in the magazine and in the direction of item delivery out of the magazine, when the rotor rotates in skidding direction of the items. A latch mechanism includes a ratchet wheel connected with the rotor for rotation therewith, and a latch arranged on a pivotable latch body. The latch mechanism is provided for locking the rotor against rotation as well as for rotating the rotor, and the blades each act to deliver items and as a stop for the items.

15 Claims, 4 Drawing Sheets

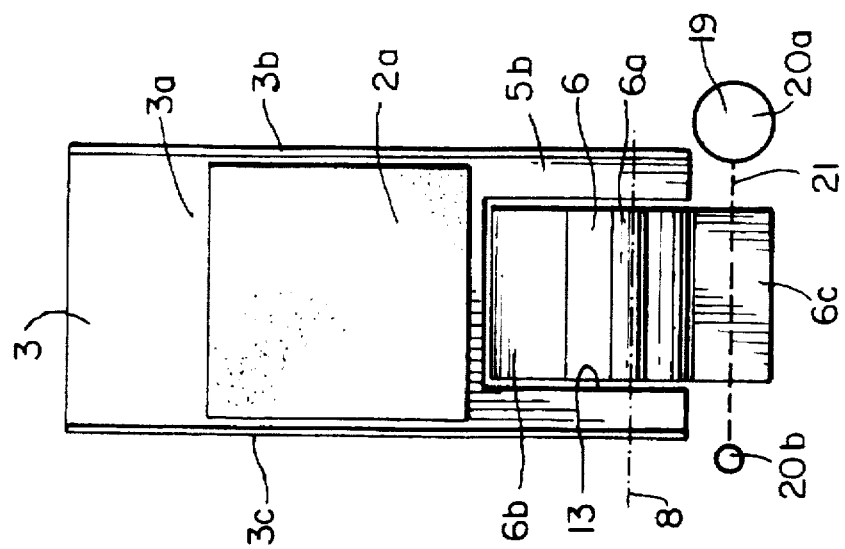
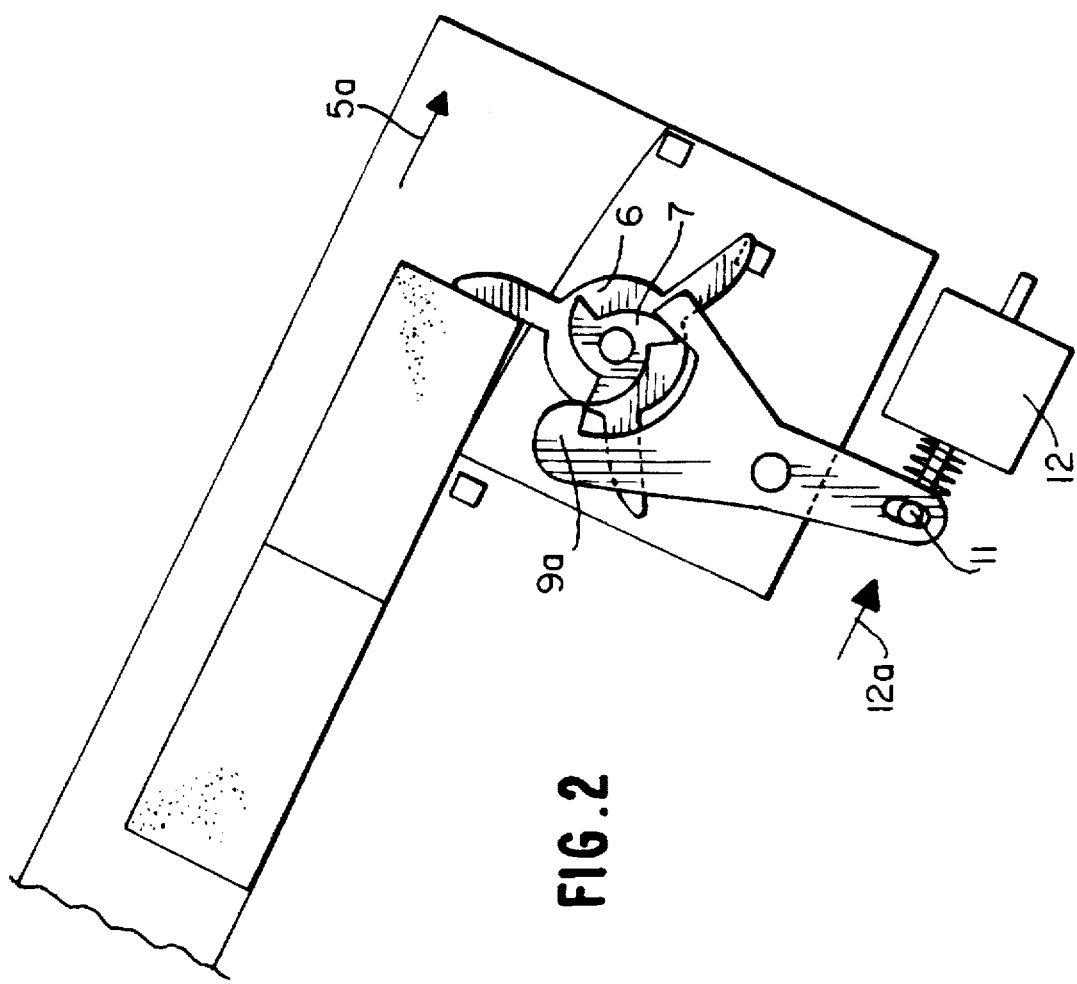

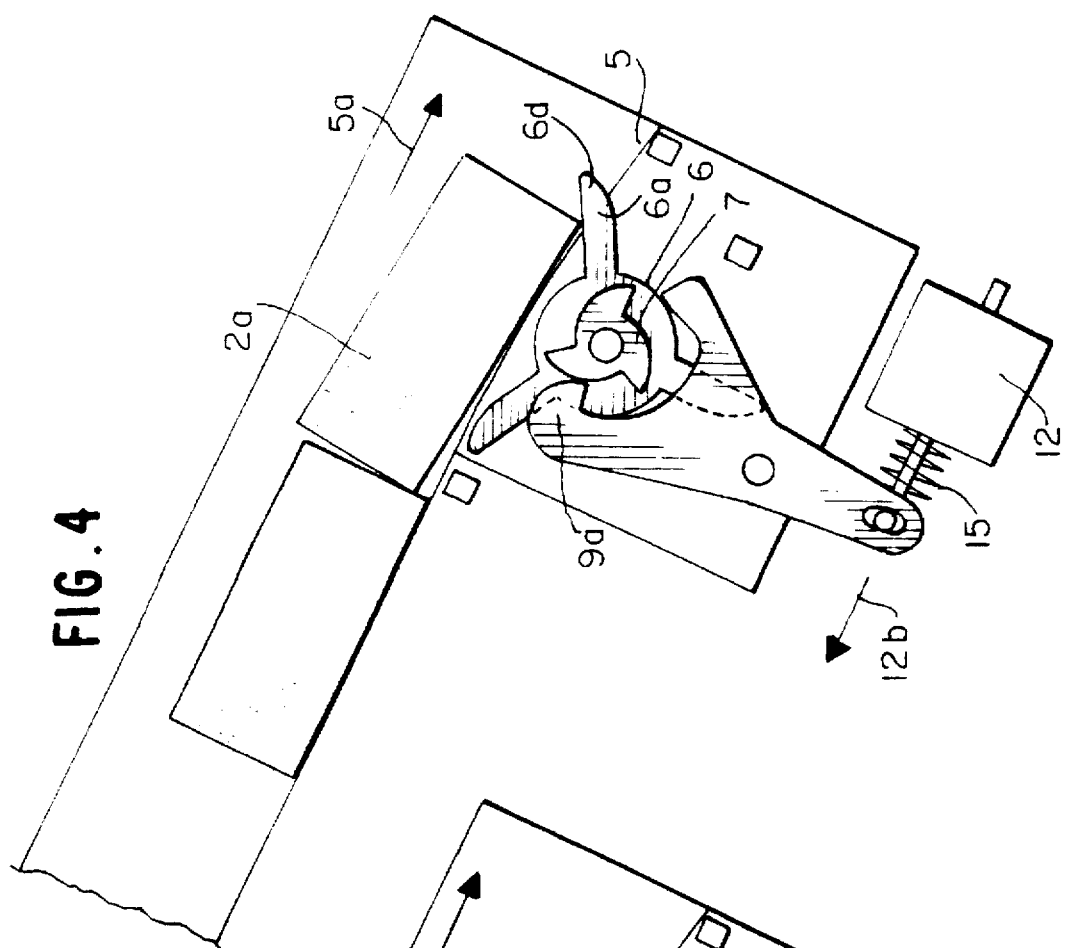
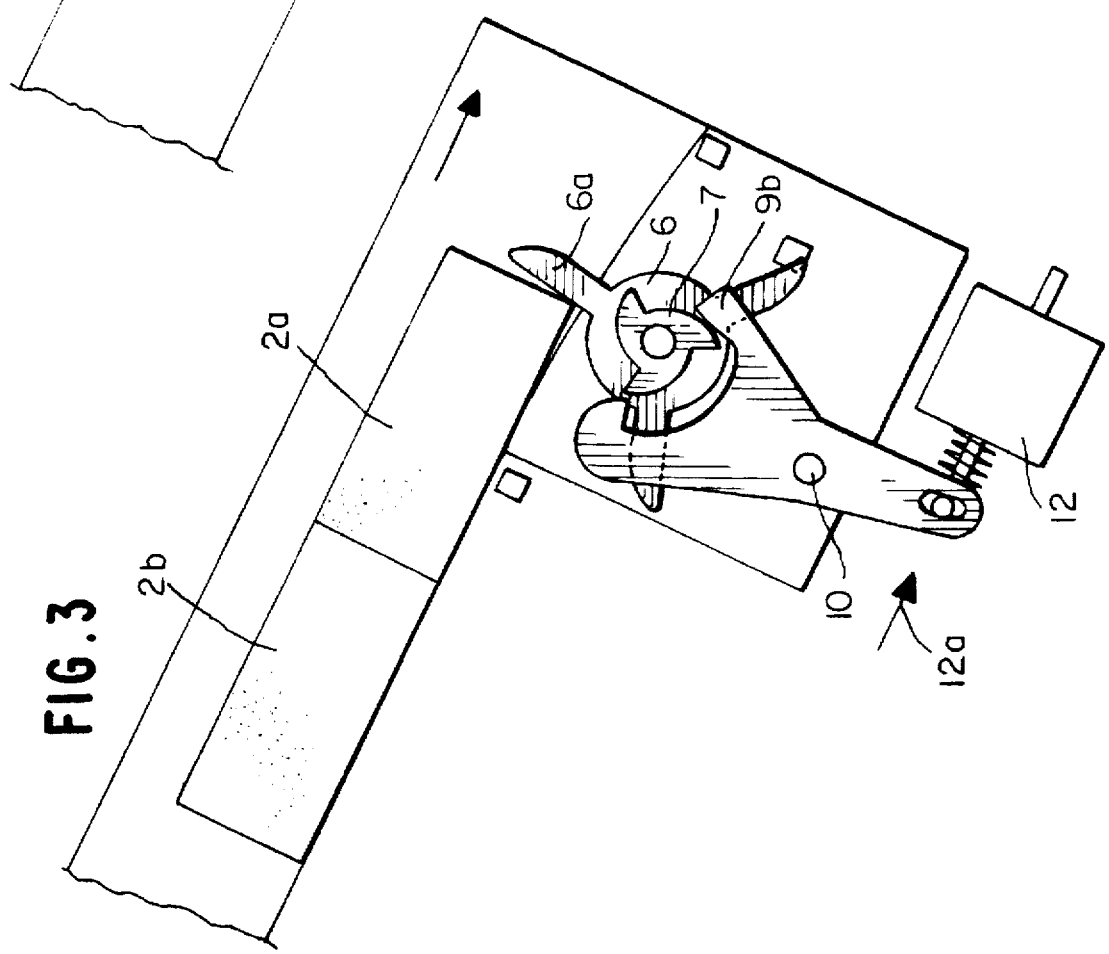

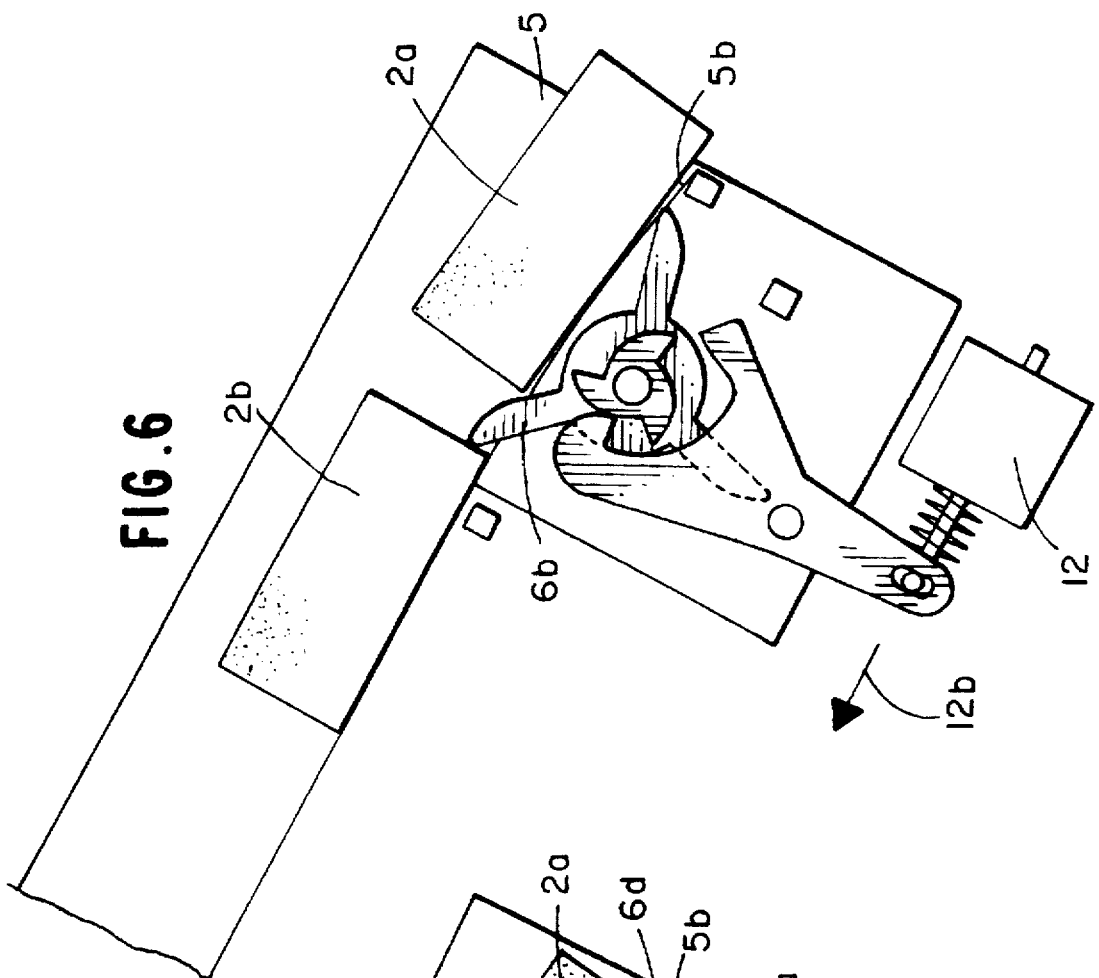
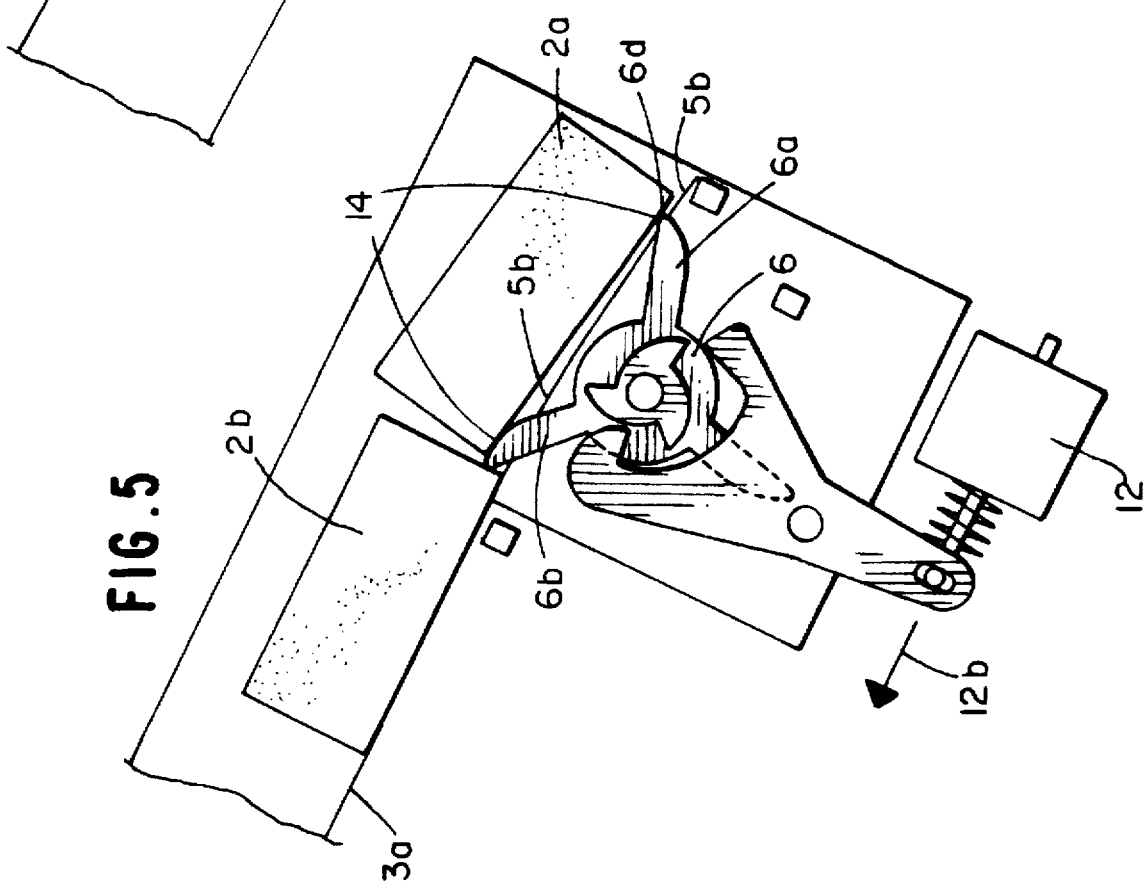

ARRANGEMENT FOR DELIVERING ITEMS FROM MAGAZINES

FIELD OF THE INVENTION

The invention relates to an arrangement for delivering items from magazines which are inclinedly arranged relative to the vertical and comprise a delivery opening including a delivery means at their lower end side. The delivery means comprises a driven rotor which is arranged in the vicinity of the delivery opening and has radial blades, and which may be locked against rotation; the axis of rotation of the rotor is arranged in or below the magazine bottom, and the blades move on a continuous path in the course of rotation of the rotor, which continuous path partially extends through the magazine; each of the blades forms a delivery means for the items, and at rotation of the rotor, the blades respectively move in a skidding direction of the items within the magazine and in a delivery direction of the items out of the magazine.

BACKGROUND ART

An arrangement of this type is known from EP 0,165,918 A1. In that arrangement, a rotor having the form of a star wheel is mounted so as to be freely rotatable between two stop ledges for the items to be delivered and may be caused to rotate and may be blocked by means of a link slide engaging on both sides at the teeth of the star wheel. At the forward movement of the slide, the item to be delivered is initially lifted over the upper edge of the stop ledges by rotation of the star wheel. In the subsequent rearward movement of the slide, the item is then further lifted by a further rotation of the star wheel and is delivered.

From DE 2,952,764 A1 also a delivery arrangement is known which comprises a star wheel that is arranged at the delivery opening, and whose shaft is controllably drivable by pneumatic, hydraulic or electric means.

In a first embodiment of a delivery arrangement according to DE 91 10 327 U, the delivery means and the stop are formed by a lifting plunger capable of being moved perpendicularly through the magazine bottom into the interior of the magazine and out of the same by a solenoid, which lifting plunger, in its at-rest position, projects into the interior of the magazine, whereas in its delivery position, its upper side ends flush with the magazine bottom. Since there the items slide over the retractable stop, the height of the same in its at-rest position may be chosen to be of any size desired. In this DE 91 10 327 U, furthermore, a stop ledge is disclosed as a further embodiment having a retractable stop, which stop ledge extends transversely to the stacking axis. The stop ledge is arranged at a right angle at the free end of a resilient tongue fixed at one end and is directed into the interior of the magazine. This resilient tongue is below the lower magazine bottom and extends parallel thereto in its at-rest position. Its free end is connected with the armature of a solenoid. In the at-rest position, the stop ledge projects into the interior of the magazine, whereas it is pulled downwards out of this at-rest position into the delivery position under elastic deformation of the resilient tongue when the solenoid is activated.

SUMMARY OF INVENTION

An object of the invention is to provide an arrangement of the initially defined kind, by means of which items even of different lengths can be conveyed out of the magazines at higher delivery speeds.

According to the invention, the arrangement of the initially defined kind for rotating and arresting the rotor comprises a latch mechanism having a ratchet wheel connected with the rotor for rotation therewith and a latch arranged on a pivotable latch body; furthermore, the blades each form a delivery means and a stop for the items.

By this design, the set object can be met well. As regards the arresting of the rotor against rotation, there results an embodiment of simple construction which works rapidly. The blades of the rotor that rotate in the delivery direction at its side facing the magazine, and in the skidding direction of the items within the magazine, each form both the delivery means as well as the stop; since the tangent direction of the rotor rotation approximately coincides with the skidding direction of the items in the delivery phase, there results a movement of the items already at the onset of the rotor rotation so that a higher delivery speed can be attained than with known arrangements.

A further marked increase in the delivery speed can be attained if the latch mechanism comprises a latch nose in addition to the latch, and the latch and the latch nose are alternately movable into and out of the circular path of the ratchet wheel and alternately arrest the ratchet wheel, and the latch nose, when moved into the circular path of the ratchet wheel, engages at a tooth back of the ratchet wheel, for rotating the ratchet wheel onwards. Thus, a forced rotational movement of the rotor in the delivery direction can be initiated whereby the delivery procedure is generally accelerated since the column of items itself need contribute only slightly to the rotation of the rotor. Thereby, the delivery speed can be increased by at least 25%. When arresting the rotor by means of the latch, a blade of the rotor stops with its free end in the interior of the magazine, above the magazine bottom, and prevents the following items from sliding further on. When the rotor is unlocked, this blade exerts a lifting and conveying function on the respective item since the tangent direction of the rotor rotation extends in the skidding and delivery direction of the items.

The latch and the latch nose may be interconnected by a mechanism which defines fixed positions of these two elements relative to each other. A preferred embodiment is characterized in that the latch and the latch nose are arranged on the latch body. Therein, it is furthermore advantageous if the latch and the latch nose alternately act on the ratchet wheel and thus on the rotor, when the latch body is actuated, and thus a forced control of the rotational rotor movement by an angle corresponding to the blade angle offset is achieved.

Advantageously, the latch body is connected with an actuating mechanism that is driven mechanically, by an electric motor, by a solenoid or by a pneumatic pressure medium cylinder. Therein, it is furthermore suitable if the actuating mechanism is provided with a pull-back spring guiding the latch into the locked position. Thereby the latch is automatically pressed into the ratchet wheel, and thus the locked position will remain fixed mechanically even if the energy supply fails. When a delivery is triggered, the unlocking will be effected against the spring force, and the rotation of the rotor in the delivery direction will be initiated by the effect of the force of the latch nose on the ratchet wheel. Ceasing of the actuation force will cause a renewed abutment of the latch contour on the ratchet wheel, whereby also the rotational movement of the rotor in the delivery rotation direction is aided.

Since this latch mechanism requires only short actuation paths, also locking and unlocking may be effected more rapidly than with conventional arrangements. Since the rotor may project by its blades into the interior of the magazine to a selectable height, independently of the latch mechanism, it is also possible by the arrangement according to the invention to deliver items of different heights at a greater speed.

According to an advantageous further development of the invention, the rotor comprises several blades, one of which forms the stop which, upon unlocking of the rotor, is rotated in the delivery direction by the item adjacent the delivery opening and inclined to such an extent that, together with the following blade which, on its circular path, enters the magazine through a corresponding opening in the magazine bottom, it contacts the item located there from the magazine bottom or slightly lifts the same, forms a skidding surface for this item and, in the course of entry into the magazine, forms a stop preventing the following item from moving on. Therein, the rotor advantageously has three blades each offset by 120° relative to one another. Upon unlocking of the rotor by releasing the latch, the blade forming the stop is rotated in the skidding direction of the items, on the one hand, and by the pressure of the latch nose on the ratchet wheel, on the other hand, and inclined to such an extent that it extends below the item, jointly with the respective following blade, so that both blades form part of a chute arranged slightly above the magazine bottom. On account of the rotation of the blades by the rotor, the item, viewed from the side, carries out a wave movement in the skidding direction. As soon as the item has left the two blades forming a partial skidding face, the following blade engages further into the interior of the magazine and locks the subsequent item against a further movement, as soon as the latch has stopped the rotor.

Advantageously, the blades of the rotor have a rectangular shape in tangential view and are movable through a corresponding recess at the end of the magazine bottom. Thereby the blades can act on the lower side of the item with a relatively large width, and the area pressure between blade and item can be kept low. The blades may, however, also be differently shaped, they may, e.g., have the shape of a trapezoid or triangle. The blade ends may also be provided with small rollers so that the items move on over them more easily.

Preferably, the magazines have a U-shaped cross-section as known per se, wherein the web of this cross-section is the magazine bottom and the legs are the lateral magazine walls. It is structurally suitable if several magazines are adjacently arranged in parallel in a vertically inclined plane.

Advantageously, the arrangement according to the invention comprises several sensors or switches, which may be designed as light scanners, as mechanical switches or the like, which may be arranged at the delivery opening, so as to detect the sliding of an item to the delivery opening, furthermore in the region of the foremost arrested item in the magazine, so as to detect the absence of an item for a delivery procedure, and at a location in the region of rotation of the blades, so as to detect the orderly rotational movement of the rotor and thus of the blades about the desired angle amount, and these sensors or switches are connected with an electronic computer. Thus, the function of the delivery means may easily be checked by the use of an electronic computer. Furthermore, the latch mechanism may optimally be controlled in respect of different items or item dimensions. An empty magazine, and thus the necessity of refilling the same, may also be determined by these sensors.

Advantageously, the arrangement according to the invention may also comprise a photoelectric barrier whose light beamn extends transversely over all the magazine ends near the delivery opening and is interruptable by an item projecting beyond the lateral magazine walls by more than a pre-selected extent. If an item is lifted over the lateral magazine walls by more than a pre-selected extent, the light beam of the photoelectric barrier is interrupted shortly, and the photoelectric barrier outputs a corresponding signal to a computer. Via this electronic computer, the drive means for driving the latch mechanism and the rotor, respectively, both in respect of their speeds and in respect of the time of switching on for adaptation to items of different lengths are adjustable and controllable. Instead of a photoelectric barrier, also a different switch, e.g. an electromechanical switch, may be provided.

BRIEF DESCRIPTION OF THE DRAWINGS

The invention will now be explained in more detail with reference to an embodiment schematically illustrated in the drawings. In the drawings.

FIG. 2 shows the arrangement according to FIG. 1 with the latch released and the latch nose contacting the ratchet wheel;

FIG. 3 shows the arrangement according to FIG. 1 with the rotor slightly rotated, wherein a force action of the latch nose on the ratchet wheel and a thrust action by the items column act in the sense of a further rotation of the rotor and wherein the latch mechanism aids the rotor movement in the delivery direction by the latch nose pressing on the ratchet wheel under spring loading;

FIG. 4 shows the arrangement according to FIG. 1 with the rotor further rotated, wherein the blade previously in its locked position is not yet below the sliding plane of the item delivery portion, and the subsequent blade has not yet contacted the item;

FIG. 5 shows the arrangement according to FIG. 1 with the rotor again further rotated, wherein the blade previously having been in its locked position and the subsequent blade form a skidding plane for the item being in the process of delivery and the subsequent item is already locked;

FIG. 6 shows the arrangement according to FIG. 1 with the rotor again further rotated, wherein the blade previously located in a locking position has already moved below the sliding plane and the item involved in the delivery process has already left the subsequent blade; and FIG. 7 shows a top view on the delivery side of the arrangement according to FIG. 1.

DESCRIPTION OF A PREFERRED EMBODIMENT

Figure 1:
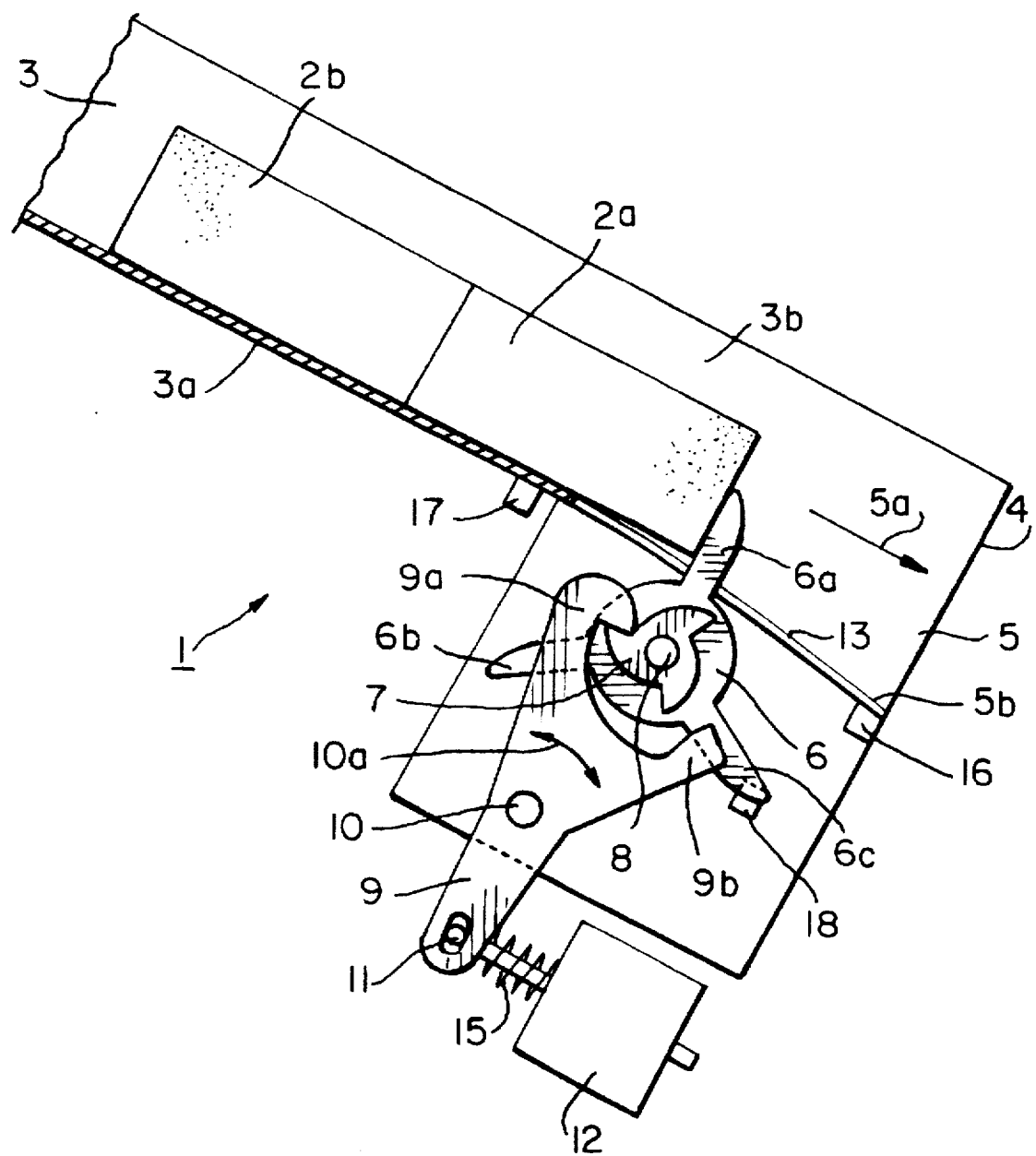
FIG. 1 shows a partially sectioned side view of a part of the arrangement according to the invention with two items stacked in a part of the magazine one behind the other, as well as a rotor mounted below the magazine bottom, and a latch mechanism which is in its locked position.

The embodiment of an arrangement 1 of the invention illustrated in the drawings, for delivering stacked items 2a, 2b comprises magazines 3 inclined relative to the vertical and provided with a delivery opening 5 at their lower end side 4. The magazines 3 have a U-shaped cross-section, wherein the web 3a of this cross-section is the magazine bottom, and the legs 3b, 3c are the lateral magazine walls.

In the vicinity of the delivery opening 5, immediately below the magazine bottom 3a, a rotor 6 having three blades 6a, 6b, 6c is arranged, which constitutes both a delivery means and a stop means. This rotor 6 is rotatable about an axis 8, wherein the tangential direction of the rotor 6 on the side of the magazine 3 extends in correspondence to the skidding direction of the items 2 in the magazine, which direction is indicated by the arrow 5a. A ratchet wheel 7 is connected with the rotor 6, and this ratchet wheel 7 cooperates with a latch 9a and a latch nose 9b provided on a latch body 9. The latch body 9 is pivotable about an axis 10 in both directions of the double arrow 10a. By engagement of the latch 9a with the teeth of the ratchet wheel 7, the rotor 6 is locked against rotation. After unlocking of the rotor 6 by release of the latch 9a from the ratchet wheel 7, the blade 6a forming the stop is rotated in the delivery or skidding direction, respectively, by the thrust of the items 2a, 2b, and is inclined, to an extent that the foremost item 2a can pass. Simultaneously, the subsequent blade 6b is upwardly guided through a corresponding opening 13 in the magazine bottom 3a towards the lower side of the passing item 2a. As soon as the item 2a has become inclined over the previously locked blade 6a acting as a stop, and thereby presses this blade downwardly even more strongly, the subsequent blade 6b rotates upwardly by the same extent and comes to abut against the front side of the next item 2b. If the rotor is locked, this blade stops the item 2b. Advantageously, the rotor may be arranged such that each blade 6a, 6b, 6c on its circular path slightly lifts the item arranged next to it from the magazine bottom 3a through a corresponding opening 13 (cf. FIG. 7) in the magazine bottom, the subsequent blade, e.g. the blade 6b, forming a skidding surface 14 together with the part 6d of the blade 6a projecting beyond the magazine bottom 3a, and the subsequent blade simultaneously locking the subsequent item 2b against further movement (cf. FIGS. 4 and 5).

The latch mechanism comprising the latch body 9 and the ratchet wheel 7 which is connected with the rotor 6 for rotation therewith is provided with an actuating mechanism including a solenoid 12 as a drive means. The arrangement is such that a slight actuation force suffices for unlocking, on the one hand, and a rotational movement of the rotor 6 about an angle of 120° is safeguarded at a single actuation of the latch mechanism, on the other hand. Therein, the two elements arranged on the latch body 9, i.e. the latch 9a and the latch nose 9b, are adapted to each other such that in each case a rotational movement aiding the delivery movement is exerted on the ratchet wheel 7 and thus on the rotor 6.

The rotor 6 may also be provided with drive means, e.g. with an electric motor. Such a drive may work independently in coordination with the position of the rotor 6. It is also advantageous to provide a drive of the rotor 6 together with the latch mechanism and to coordinate this drive with the drive of the latch mechanism. For this purpose, an electronic computer may be provided.

An electronic computer may also be provided for adapting the rotor movement to items 2a, 2b of different lengths.

The arrangement 1 designed according to the invention works as follows:

It is departed from the locked position according to FIG. 1; in that position, the blade 6a of the rotor 6 forms a locking stop for the item 2a. In this position, the ratchet wheel 7, and thus also the entire rotor 6, is prevented from rotating by the latch 9a of the latch body 9.

In the position according to FIG. 2, the latch 9a has been drawn out of the circular path of the ratchet wheel 7 by actuation of the solenoid 12, whereby the connecting link 11 between solenoid and latch body has moved in the attraction direction 12a of the solenoid. Thereby a rotational movement of the rotor 6 in the direction 5a of delivery has become possible.

The position according to FIG. 3 is reached by the rotor 6 and the locking rotor blade 6a on account of the downwardly acting component of the weight forces of the items 2a, 2b, on the one hand, and on account of the contact force between the latch nose 9b and the ratchet wheel 7, on the other hand, which contact force aids the delivery movement by initiating a rotational movement of the rotor 6 in the delivery direction. The force of the solenoid 12 which acts in the attraction direction 12a thus is transferred to the latch nose 9b according to the lever transmission about the axis 10.

The position according to FIG. 4 is reached in that the solenoid 12 is switched off and in that the restoring force of the spring 15 in the direction of the arrow 12b, by the above-mentioned lever transmission, causes an introduction of force via the latch 9a on the ratchet wheel 7 and thus on the rotor 6 such that the rotor 6 is aided in its rotational movement in the delivery direction 5a, which accelerates the delivery process. The item 2a still abuts on the blade 6a.

In the position according to FIG. 5, the rotor 6 has moved on in the delivery direction as compared to the position illustrated in FIG. 4 in a manner that the blade 6a approaches the sliding face 5b of the magazine bottom upstream of the delivery opening 5. The blade 6b and that portion of the blade 6a which projects beyond the sliding face 5b at first together form a skidding surface 14 for the item 2a, whereupon, when the blade 6a has come to extend below the level of the sliding face 5b in the course of rotor rotation, the item 2a slides further on in the course of the delivery movement while lying on the blade 6b and on the sliding face 5b. The following blade 6b simultaneously forms a lock for the following item 2b in the delivery direction.

The position according to FIG. 6 is reached when the item 2a has slid on the sliding face 5b so far in the delivery direction that it already protrudes from the delivery opening 5. The blade 6b still locks the following item 2b.

A complete working cycle is finished when the item 2a to be delivered has completely passed the delivery opening 5, and the rotor 6 forms a lock for the item 2b with its blade 6b, analogous to the illustration of FIG. 1 in respect of the item 2a and the blade 6a. This is the case when the rotor 6 has reached the position illustrated in FIG. 1, aided by the gravity acting on the item 2b and the additional torque supplied by the latch mechanism. The additional torque thus results from the force acting from the spring 15 of the solenoid 12 via the lever transmission already mentioned on the latch 9a and further on the ratchet wheel 7. Item 2b, which then is in that position assumed by item 2a in FIG. 1, is then ready for delivery.

Sensors 16, 17 and 18 which, as mentioned before, are arranged at the delivery opening, in the region of the foremost arrested item in the magazine and at a location within the range of rotation of the blades may be used to control the entire delivery process such that their signals are suitably linked in an electronic computer unit or individually processed to control the drive of the rotor 6, e.g. by fixing the switch-on time and switch-on period of the solenoid 12.

A variant thereto results if, as the sensor 16, a sensor is provided which senses the lifting of the item 2a from the magazine bottom, which lifting occurs when the item starts to move. Suitable for this is, e.g., an optical reflex sensor of low range, whose light beam is directed to the item 2a from below, or, e.g., a micro-switch whose sensor is arranged in the magazine bottom. As the item is being lifted off the magazine bottom, which will happen when the item reaches the sliding face 5b whose inclination exceeds that of the magazine bottom 3a (cf. FIG. 4), the reflex signal of the sensor stops. This may be used to control the solenoid 12 in that the solenoid 12 which has been switched on to initiate the delivery movement, remains switched on until the reflex signal stops. Then the item 2a has already started to move towards the delivery opening 5.

Advantageously, also a photoelectric barrier 19 may be provided, as is illustrated schematically in FIG. 7, by which the proper course of the delivery process can be monitored. The light beam 21 directed from the source of light 20a to the sensor 20b of this photoelectric barrier extends in the region of the delivery opening 5 at a pre-selected distance above the level defined by the upper edges of the lateral magazine walls 3b, 3c. The light beam 21 thus is interrupted by items which, in the course of the delivery procedure, project beyond the lateral magazine walls by more than the distance which has been selected when positioning the photo-electric barrier 20.

What is claimed is:

1. An arrangement for delivering items from a magazine inclined relative to the vertical, through a delivery opening at a magazine lower end side including a rotor provided with radial blades, the rotor located adjacent said delivery opening of said magazine so as to act as a delivery means for said magazine, said magazine having a bottom, said rotor having an axis of rotation arranged in or below the bottom of said magazine, and said blades while rotating moving on a continuous path partially extending through said magazine, each of said blades serving as said delivery means for said items and moving in said magazine and in direction of item delivery out of the magazine, when said rotor rotates in skidding direction of the items, a latch mechanism including a ratchet wheel connected with said rotor for rotation therewith and a latch arranged on a pivotable latch body, said latch mechanism forming means for locking said ratchet wheel and said rotor against rotation as well as for rotating said ratchet wheel and said rotor, and said blades each acting as said delivery means and as a stop for said items, said latch mechanism being provided with an actuating mechanism connected to said latch body and driving means for said actuating mechanism, said driving means being one selected from the group consisting of mechanical means, electric means, solenoid means and pneumatic pressure medium cylinder means.

2. An arrangement as seth forth in claim 1, wherein said latch mechanism further comprises a latch nose, and wherein said ratchet wheel includes teeth, each tooth having a tooth back, and moving on a circular path, said latch and said latch nose being alternately movable into and out of the circular path of said ratchet wheel so as to lock said ratchet wheel, and said latch nose engaging on a tooth back of said ratchet wheel in the direction of further rotation of the ratchet wheel when said latch nose is moved into said circular path of said ratchet wheel.

3. An arrangement as set forth in claim 2, wherein said latch and said latch nose are interconnected by a mechanism defining fixed positions of said latch and said latch nose relative to each other.

4. An arrangement as set forth in claim 2, wherein said latch and said latch nose are arranged on said latch body.

5. An arrangement as set forth in claim 4, wherein, upon actuation of said latch body, said latch and said latch nose alternately act on said ratchet wheel and thus on said rotor so as to effect a positive control of the rotational movement of said rotor about an angle corresponding to the angle of offset of said blades.

6. An arrangement as set forth in claim 1, further comprising a pull-back spring provided for said actuating mechanism to guide said latch in the locked position.

7. An arrangement as set forth in claim 1, wherein said latch body is associated with a solenoid serving as latch body driving means and further comprising a detector means for detecting lifting of the item arranged next to the delivery opening, off the magazine bottom and controlling said solenoid, said solenoid which acts to rotate said rotor when activated, being turned off when the item is lifted off the magazine bottom when said item starts to move.

8. An arrangement as set forth in claim 1, further comprising latch body drive means and an electronic computer arranged to regulate the speed of said latch body drive means and to adapt said latch body drive means to items of different lengths.

9. An arrangement as set forth in claim 1, wherein said rotor has several blades, and wherein a first one of said blades forms a stop to be rotated by the item adjacent the delivery opening in the delivery direction after unlocking of the rotor, and to be inclined by an extent such that said first one of said blades and a following blade, which following blade, on its circular continuous path, contacts the item located there through a corresponding opening in the magazine bottom from below and slightly lifts said item, together form a skidding surface for said item, and said following blade, when it enters said magazine, forms a stop preventing the following item from moving on.

10. An arrangement as set forth in claim 1, wherein said rotor is provided with a plurality of blades equally offset relative to each other.

11. An arrangement as set forth in claim 1, wherein said blades of said rotor, in tangential view, have a shape selected from the group of rectangular, trapezoidal or triangular shapes, a corresponding recess being provided at the end of the magazine bottom, said blades being movable through said corresponding recess.

12. An arrangement as set forth in claim 1, wherein said magazine has a U-shaped cross-section with a web and legs, the magazine bottom being the web of said U and the legs of said U comprising lateral magazine walls.

13. An arrangement as set forth in claim 1, wherein several magazines are adjacently arranged in parallel in a vertically inclined plane.

14. An arrangement as set forth in claim 1, further comprising a photoelectric barrier having a light beam extending transversely over the magazine end near the delivery opening, said light beam being interruptable by an item projecting beyond the lateral magazine walls by more than a pre-selected extent.

15. An arrangement as set forth in claim 1, further comprising detector means arranged at the delivery opening so as to detect sliding of an item towards the delivery opening, in the region of the foremost arrested item in the magazine so as to detect any possible absence of an item for a delivery procedure, and at a location within the rotational range of said blades so as to detect the rotational movement of said rotor, and thus of said blades, about the desired angle, and an electronic computer connected with these detector means.

* * * * *

UNITED STATES PATENT AND TRADEMARK OFFICE
CERTIFICATE OF CORRECTION

PATENT NO.   : 5,641,161
DATED        : June 24, 1997
INVENTOR(S)  : Karl FREUDELSPERGER It is certified that error(s) appears in the above-identified patent and that said Letters Patent is hereby corrected as shown below:

On the title page, item [30];

In the Foreign Application Priority Data, delete "[AU]   Australia" and insert -[AT]   Austria-.

Signed and Sealed this

Twenty-third Day of September, 1997

Attest:

BRUCE LEHMAN

*Attesting Officer*                *Commissioner of Patents and Trademarks*